(No Model.)
J. F. WISWELL.
PROCESS OF AND APPARATUS FOR TREATING ORES.
No. 495,212. Patented Apr. 11, 1893.
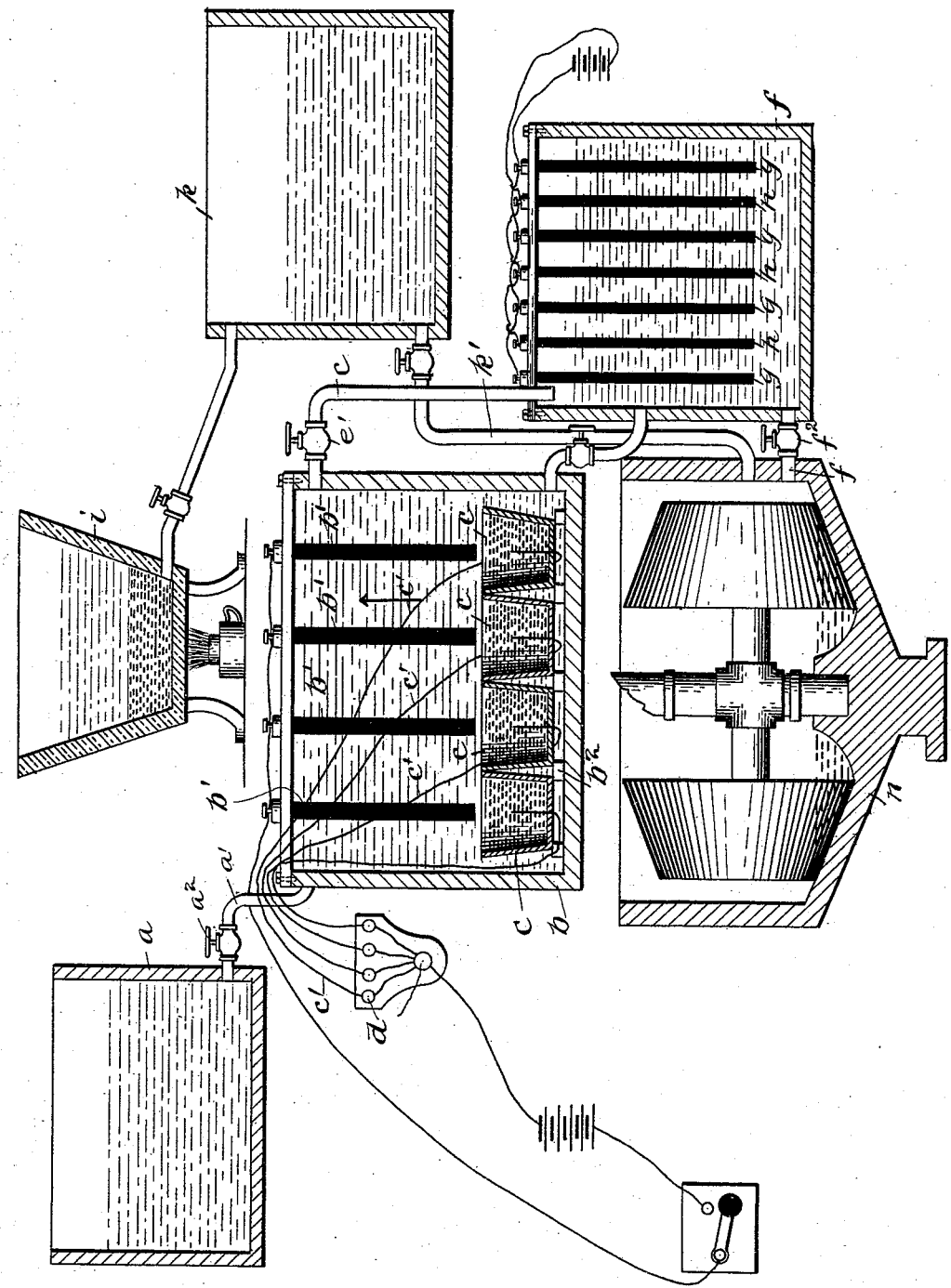
WITNESSES.
INVENTOR.
By
HIS ATTORNEYS.

UNITED STATES PATENT OFFICE.

JOHN FRANKLIN WISWELL, OF WEST MEDFORD, MASSACHUSETTS, ASSIGNOR TO THE ELECTRIC GOLD AND SILVER CHLORINATION COMPANY, OF KITTERY, MAINE, AND BOSTON, MASSACHUSETTS.

PROCESS OF AND APPARATUS FOR TREATING ORES.

SPECIFICATION forming part of Letters Patent No. 495,212, dated April 11, 1893.

Application filed May 10, 1892. Serial No. 432,425. (No model.)

*To all whom it may concern:*

Be it known that I, JOHN FRANKLIN WISWELL, of West Medford, in the county of Middlesex and State of Massachusetts, have invented certain new and useful Improvements in the Process of and Apparatus for Treating Ores, of which the following is a specification.

My invention has reference to an improved method of and apparatus for treating ores to facilitate the extraction of precious metals therefrom; and has for its object to produce an amalgamating fluid which will be more efficient, and at the same time cheaper than any heretofore employed and contains other new and useful results presently to be described.

In practicing my invention I prepare a strong solution of salt in which are submerged a number of receptacles containing mercury. A current of electricity is caused to pass through the mercury and salt in the proper direction, the effect of which is to change the mercury into calomel by the action of the chlorine liberated by the electricity. As it is desirable to maintain an inflow of the salt solution during the preceding step of the process, a receptacle is provided which receives the overflow, and which is also subjected to an electric current to produce sodium hypochlorate.

The calomel produced as described by the first step of the process is treated with aqua regia under heat which produces a soluble mercuric chloride which can be diluted to the desired extent this constituting a stock to be used as occasion requires. The soluble mercuric chloride and the sodium hypochlorite are admitted simultaneously to the crusher and acting upon the pulverized ores amalgamates the particles of precious metal as will be readily understood by those skilled in the art to which the invention relates.

It is desirable that iron be present during the amalgamation in order that the mercury may be freely liberated, and this iron may be either present in the ore itself; liberated from the iron crusher by the sodium hypochlorite or be introduced separately in the form of iron filings.

It will be understood by those skilled in the art that the iron used in the process should be free from rust viz: "bright iron" as the oxide of iron formed by the rust will greatly hinder the action of the iron upon the mercury.

My invention further contemplates an arrangement of devices constituting a desirable apparatus with which the foregoing method may be put into practice, although it is obvious that the process is not limited to any specific form of means in the execution thereof.

In the accompanying drawings, I have shown what I deem the best means of practicing my invention, and in which $a$ represents a tank or other receptacle in which I prepare the solution of salt, and has a connection $a'$ and valve $a^2$ through which the salt solution may be conveyed to another receptacle $b$ having the carbon rods $b'$ suspended therein, and connected electrically with the negative pole of a suitable generator.

In the bottom of receptacle $b$ are a number of strips $b^2$ upon which I place the cups $c$ directly under the carbon rods, the ends of which are in close proximity to the tops of the cups, as shown. These cups are all electrically connected with the positive pole of the generator through the posts $d$ by wires $c'$ which are insulated to prevent contact with the fluid in the receptacle, and are led through the bottoms and up into the cups, the portions of the wires inside said cups being uninsulated. Each cup and its insulating wire is readily detachable from the posts $d$ and may be easily removed from receptacle $b$. Connections lead from tank $b$ to another tank $f$ in which carbon rods $g$ and $h$ are suspended, as shown, by a suitable strip or support. Rods $g$ are connected to one pole of a generator, as shown, and rods $h$ to the other. From tank $f$ a pipe and valve $f'$ $f^2$ lead to the crusher $n$.

I further provide a porcelain vessel $i$ adapted to be heated and suitably connected to a storage tank $k$ which is in turn provided with piping $k'$ to convey the liquid therein to the crusher $n$.

The operation of the invention will now be readily understood.

A solution of salt is prepared in tank $a$ and led therefrom into tank $b$ in which are placed the cups $c$ nearly filled with mercury. A current of electricity is now caused to pass in the proper direction between the mercury and the carbon electrodes through the salt solution as an electrotype until the mercury has become calomel by the action of the chlorine. The overflow from tank $b$ is led into tank $f$ in which another current of electricity separates the sodium hypochlorite and sodium forming sodium hypochlorite. The calomel is placed in receptacle $i$ and there treated with aqua regia under heat forming a soluble mercuric chloride which is led into tank $k$ and there diluted and kept as a stock. During the crushing of the ores the sodium hypochlorite and mercuric chloride are admitted simultaneously into the crusher and the precious metals are acted upon in the well known manner of amalgamation.

My new process is much cheaper than any heretofore known to me in that a great amount of amalgamating material is produced at slight cost and the amalgamation greatly facilitated by the thorough permeation of the mercuric chloride solution and the quickening action of the sodium.

I claim—

1. An improved process of treating ores which consists in submerging mercury in a solution of common salt connecting the mercury with the positive pole of a generator, and the salt solution with the other pole so that the current will decompose the salt solution and cause the chlorine to be attracted to the mercury forming calomel; treating the calomel with aqua regia forming a soluble mercuric chloride, diluting the latter with water, treating undecomposed salt solution with an electric current to produce sodium hypochlorite and introducing the soluble mercuric chloride and sodium hypochlorite simultaneously upon the crushed ore, as and for the purposes set forth.

2. An improved process of treating ores which consists in submerging mercury in a solution of common salt connecting the mercury with the positive pole of a generator, and the salt solution with the other pole so that the current will decompose the salt solution and cause the chlorine to be attracted to the mercury forming calomel, treating the calomel with aqua regia forming a soluble mecuric chloride, diluting the latter with water, treating the undecomposed salt solution with an electric current to produce sodium hypochlorite, disintegrating the ores, introducing the soluble mercuric chloride and the chlorine water simultaneously as the ores are being disintegrated and adding bright iron as and for the purposes set forth.

3. An apparatus for treating ores to extract precious metals therefrom comprising in its construction, a tank $a$ in which the chloride of sodium is dissolved, tank $b$ connected with tank $a$, and provided with a suitable strip or support from which carbon rods $b'$ are suspended, raised supports $b^2$, cups $c$ adapted to rest thereon and having wires therein leading to posts $d$, all connected with the positive pole of a generator, the carbon rods being all connected with the negative pole of said generator, vessel $i$ in which the calomel is treated having suitable connection to reservoir $k$ adapted to contain the stock or diluted mecurial solution and connection such as pipe $k'$ to convey said solution to the crusher, and tank $f$ adapted to receive the overflow of chloride of sodium from tank $b$ and connections as pipe $f$ therefrom to the crusher and rods $g\ h$ connected to the respective poles of a generator, substantially as described.

In testimony whereof I have signed my name to this specification, in the presence of two subscribing witnesses, this 23d day of April, A. D. 1892.

JOHN FRANKLIN WISWELL.

Witnesses:
JACOB C. WISWELL,
JONATHAN CILLEY.